US012124350B2

(12) United States Patent
Sewani et al.

(10) Patent No.: US 12,124,350 B2
(45) Date of Patent: Oct. 22, 2024

(54) REAL-TIME POWER METER FOR OPTIMIZING PROCESSOR POWER MANAGEMENT

(71) Applicant: Intel Corporation, Santa Clara, CA (US)

(72) Inventors: Aman Sewani, Sunnyvale, CA (US); Nazar Haider, Fremont, CA (US); Ankush Varma, Portland, OR (US); Lan Vu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 16/860,967

(22) Filed: Apr. 28, 2020

(65) Prior Publication Data

US 2021/0334187 A1 Oct. 28, 2021

(51) Int. Cl.
*G06F 11/30* (2006.01)
*G06F 1/08* (2006.01)
*G06F 1/32* (2019.01)
*G06F 1/3296* (2019.01)

(52) U.S. Cl.
CPC .......... *G06F 11/3062* (2013.01); *G06F 1/08* (2013.01); *G06F 1/3296* (2013.01); *G06F 11/3024* (2013.01)

(58) Field of Classification Search
CPC .......... G06F 1/324; G06F 1/3296; G06F 1/08; G06F 11/3062; G06F 11/3024
See application file for complete search history.

(56) References Cited

U.S. PATENT DOCUMENTS

| 6,574,740 | B1 * | 6/2003 | Odaohhara | G06F 1/32 |
| | | | | 713/340 |
| 7,536,452 | B1 * | 5/2009 | Cao | H04L 63/1408 |
| | | | | 713/153 |
| 8,762,097 | B2 * | 6/2014 | Millet | G06F 1/206 |
| | | | | 374/170 |
| 9,069,555 | B2 * | 6/2015 | Fetzer | G06F 1/3296 |
| 9,298,909 | B2 * | 3/2016 | Du | G06F 1/28 |
| 2003/0126476 | A1 * | 7/2003 | Greene | G06F 1/329 |
| | | | | 713/300 |
| 2005/0022043 | A1 * | 1/2005 | Yamaji | G06F 1/32 |
| | | | | 713/340 |
| 2005/0188230 | A1 * | 8/2005 | Bilak | G06F 1/3284 |
| | | | | 713/300 |

(Continued)

*Primary Examiner* — Jaweed A Abbaszadeh
*Assistant Examiner* — Cheri L Harrington
(74) *Attorney, Agent, or Firm* — Nicholson De Vos Webster & Elliott LLP

(57) ABSTRACT

A scheme is provided for a processor to measure or estimate the dynamic capacitance (Cdyn) associated with an executing application and take a proportional throttling action. Proportional throttling has significantly less impact on performance and hence presents an opportunity to get back the lost bins and proportionally clip power if it exceeds a specification threshold. The ability to infer a magnitude of power excursion of a power virus event (and hence, the real Cdyn) above a set power threshold limit enables the processor to proportionally adjust the processor operating frequency to bring it back under the limit. With this scheme, the processor distinguishes a small power excursion versus a large one and reacts proportionally, yielding better performance.

8 Claims, 7 Drawing Sheets

(56) References Cited

U.S. PATENT DOCUMENTS

| | | | | |
|---|---|---|---|---|
| 2007/0260897 | A1* | 11/2007 | Cochran | G06F 1/3203 |
| | | | | 713/300 |
| 2008/0109811 | A1* | 5/2008 | Krauthgamer | G06F 1/329 |
| | | | | 718/104 |
| 2012/0079299 | A1* | 3/2012 | Cepulis | G06F 1/263 |
| | | | | 713/320 |
| 2012/0096288 | A1* | 4/2012 | Bates | G06F 1/3206 |
| | | | | 713/320 |
| 2012/0124403 | A1* | 5/2012 | Goodrum | G06F 1/3203 |
| | | | | 713/320 |
| 2013/0173946 | A1* | 7/2013 | Rotem | G06F 1/3206 |
| | | | | 713/340 |
| 2015/0102791 | A1* | 4/2015 | Haider | G05F 1/46 |
| | | | | 323/281 |
| 2015/0177289 | A1 | 6/2015 | Haider et al. | |
| 2015/0370303 | A1* | 12/2015 | Krishnaswamy | G06F 1/3243 |
| | | | | 713/322 |
| 2015/0378429 | A1* | 12/2015 | Vogman | G06F 1/28 |
| | | | | 713/320 |
| 2016/0170642 | A1* | 6/2016 | Miyamoto | G06F 3/061 |
| | | | | 711/103 |
| 2016/0378149 | A1* | 12/2016 | Kam | G06F 1/3206 |
| | | | | 713/320 |
| 2017/0052586 | A1* | 2/2017 | Nejedlo | G06F 1/28 |
| 2019/0146569 | A1* | 5/2019 | Nge | H02M 1/08 |
| | | | | 713/320 |
| 2019/0272021 | A1* | 9/2019 | Olarig | G06F 3/0679 |
| 2019/0377405 | A1* | 12/2019 | Uan-Zo-Li | G06F 1/3206 |
| 2020/0201408 | A1* | 6/2020 | Lehwalder | G05B 23/0235 |

* cited by examiner

REAL-TIME POWER METER FOR OPTIMIZING PROCESSOR POWER MANAGEMENT

BACKGROUND

As number of processor cores increase for servers, power management is needed to balance between optimal performance and a total power envelope. Without such power management, a power supply may be overloaded. One way to monitor power is to compare an input supply to a processor and infer when the processor violates a factory programmed power limit or envelope. In response to such violation, the processor may take pre-determined throttling action to manage the electrical stress caused by high power usage. Generally, the action taken by the processor assumes a worst-case virus condition that results in maximum dynamic capacitance, and steps down an operating frequency to stay within a power limit. However, such assumption of worst-case virus condition may result in more than necessary performance penalty.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
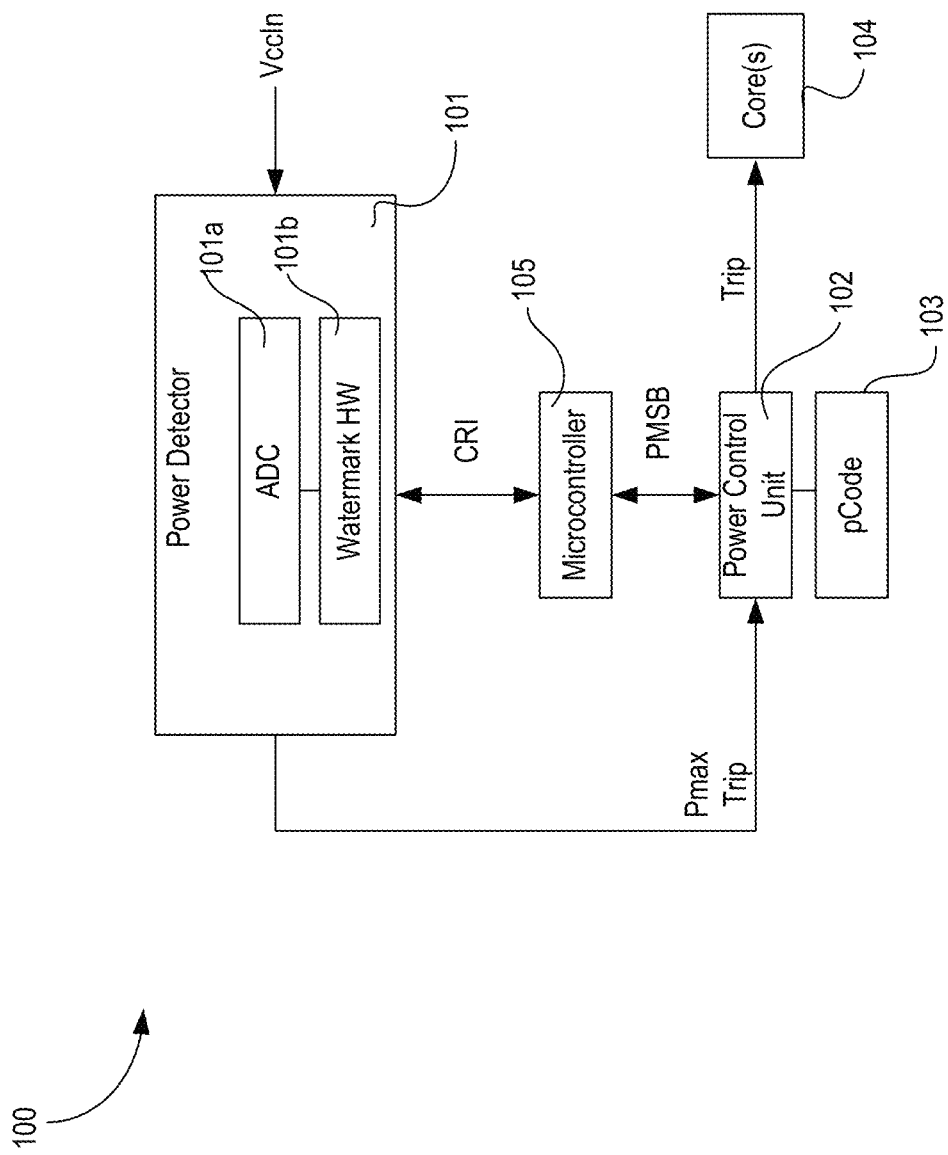
FIG. 1 illustrates a simplified block diagram of a power management system for proportional throttling, in accordance with some embodiments.

A worst-case virus condition is typically assumed when a processor crosses a power limit threshold caused by an application executing on the processor. In this condition, worst-case virus dynamic capacitance (Cdyn) is presumed regardless of an actual magnitude of excursion. In this case, there is no physical IO (input-output) interface integrated with proportional throttling. For example, when the processor assumes a maximum power virus Cdyn upon receiving a throttle indication, it responds to it by dropping an operating frequency low enough to prevent a recurrence of this event. If the application was not linked to the maximum power virus Cdyn, the performance penalty could be significant. For example, at colder temperatures where Inverse Temperature Drift (ITD) results in higher power due to increased operating voltage, minor excursions may be observed above a maximum power threshold when the temperature drops below 40 Celsius. In this case, the processor proactively clips operating frequencies because of the performance impact from assuming full virus excursion for even borderline breaches of the maximum power threshold limit.

In some embodiments, a scheme is provided for the processor to measure or estimate the Cdyn of the application and take a proportional throttling action. Proportional throttling has significantly less impact on performance and hence presents an opportunity to get back the lost performance and proportionally clip power if it exceeds a specification threshold.

In some embodiments, a new path through physical GPIO (general purpose input/output) port (PMAX_TRIGGER_IO) is provided where a user can inject a signal to initiate proportional throttling. This assertion can be treated by a downstream logic the same way as an embedded maximum power detector event and can be injected in parallel with the embedded maximum power detector or independent of the embedded maximum power detector. A user can choose to proportionally scale down the processor power consumption relative to the real-time power inferred from an input power supply domain. PROCHOT injections take the processor down to a pre-defined P-state (a power stated defined by Advanced Configuration and Power Interface (ACPI)) but events injected through this port would allow them to scale power down relative to the transient power consumption of the processor. PROCHOT stands for processor hot which is the signal that is activated within the CPU when it reaches approximately 100 C to 105 C depending on a model number for the processor.

There are many technical effects of various embodiments. For example, the ability to infer a magnitude of power excursion of a power virus event (and hence, the real Cdyn) above a set power threshold limit enables the processor to proportionally adjust the processor operating frequency to bring it back under the limit. With this scheme, the processor distinguishes a small power excursion versus a large one and reacts proportionally, yielding better performance. Because proportional response to an excursion yields a performance-sensitive response by design, it is now viable for products and users to make intelligent performance versus power supply capacity tradeoffs. For example, users can choose to adjust (e.g., lower) the conservative, factory programmed value for the power threshold at which electrical throttling is engaged at the cost of proportional loss in performance for some workloads. Clipping the threshold can potentially yield savings on expensive resources required for building bigger platform power supply designs. In some embodiments, the infrastructure for engaging proportional throttling and changing trip level can be implemented in software such as Basic Input Output Operating System (BIOS), firmware, etc. The scheme of various embodiments lowers maximum power supply capacity requirements for the user, or higher peak frequencies without increasing power threshold limit (PmaxApp) requirements for power delivery. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

Here, the term "analog signal" generally refers to any continuous signal for which the time varying feature (variable) of the signal is a representation of some other time varying quantity, i.e., analogous to another time varying signal.

Here the term "digital signal" generally refers to is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

As discussed with reference to prior art, when a PMax (maximum power) Detector fires (based on input supply Vin threshold), the indication is immediately routed to all the processor cores through physical wires. In response, the processor cores transition to a clock squashing state where the dynamic power of the processor is brought down (throttled). This state may last for a duration (e.g., about 100 µs), after which the cores frequency and voltage are lower down to an operating point assuming full virus Cdyn is running on them. A power management firmware, such as Pcode, drops the processor cores to a lower frequency and operates there before a staircase recovery. However, such assumption of worst-case virus condition may result in more than necessary performance penalty.

FIG. 1 illustrates a simplified block diagram of power management system 100 for proportional throttling, in accordance with some embodiments. In some embodiments, system 100 comprises power detector 101, power control unit (PCU) 102, memory to store instructions 103, one or more processor cores 104, and microcontroller 105. In some embodiments, power detector 101 comprises an analog-to-digital converter (ADC) 101a and a logic (including hardware (HW)) for watermark detection 101b.

An ADC is an apparatus that converts continuous physical quantities analog voltages) to digital numbers that represent the amplitude of the physical quantities. In some embodiments, ADC 101a converts the analog VccIn to its corresponding digital representation. In various embodiments, ADC 101a continuously converts the voltage of the input power supply to a digital representation. Any suitable ADC may be used to implement ADC 101a. For example, ADC 101a is one of: direct-conversion ADC (for flash ADC), two-step flash ADC, successive-approximation ADC (SAR ADC), ramp-compare ADC, Wilkinson ADC, integrating ADC, delta-encoded ADC or counter-ramp, pipeline ADC (also called subranging quantizer), sigma-delta ADC (also known as a delta-sigma ADC), time-interleaved ADC, ADC with intermediate FM stage, or time-stretch ADC. For purposes of explaining the various embodiments, ADC 101a is considered to be flash ADC.

The digital representation of VccIn is analyzed by watermark logic 101b, which determines the lowest voltage level of VccIn and saves that digital representation (code) in memory (e.g., volatile or non-volatile memory). This saved digital representation is the watermark (WM) level for VccIn. When VccIn level crosses a predetermined or programmable threshold level, power detector 101 issues or fires a power trip signal (Pmax Trip). PCU 102 receives the Pmax Trip and generates a subsequent throttle or Trip signal for the one or more processor cores 104. In some embodiments, Watermark HW 101b watermarks the minimum VccIn measured after the power excursion flips a comparator and throttles the core(s) 104. This minimum VccIn, collected over a subsequent time window of, for example, 100 μs is read by the firmware to decide the optimum operating frequency for the core(s) 104.

Here, the term "throttle" generally refers to reducing frequency of a clock for the processor core(s) 104. The frequency can be reduced in a number of ways. For example, a divider ratio for a phase locked loop (PLL) can be modified to change the output clock frequency. In another example, a clock can be "squashed" in that every other (or any number) of rising edges are suppressed, which in turn reduces the clock frequency. In one example, a voltage supply to the core(s) 104 is reduced to reduce the operating frequency. For example, a local regulator for the core(s) is instructed to lower its output voltage in response to the external trip signal being asserted. These examples and not limited examples, and may not be mutually exclusive. For example, one or more methods of throttling may be applied concurrently.

The instructions (e.g., pCode) 103 may be executed by PCU 102 to determine when to issue the external trip signal and the level of throttling. In some embodiments, other firmware 103 (e.g., operating system, or software drivers) may be used that has access to Pmax Trip, operating frequencies of the core(s) 104, operating voltages of the core(s) 104 to determine when to issue the external trip signal and the level of throttling. PCU 102 may communicate with a microcontroller 105 via a side band interconnect fabric. The fabric may be optimized for sending and receiving messages between PCU 102 and microcontroller 105. In some embodiments, microcontroller 105 communicates with other logic and systems via a control register interface (CRI).

In some embodiments, firing of the PMax Detector 101 triggers a watermarking routine on ADC 101a, monitoring the minimum voltage (maximum power) measured on the input supply VccIn domain. In some embodiments, this watermarking continues to run until watermark firmware 101b reads the watermark. The read watermark is then compared against the VccIn for different power levels (such as Pmax and PmaxApp) in the clock squashed state characterized and calibrated during manufacturing. An electrical design point (EDP) equation is used to compute the optimum operating point (clock frequency and/or supply voltage for the processor core(s) 104).

Figure 2:
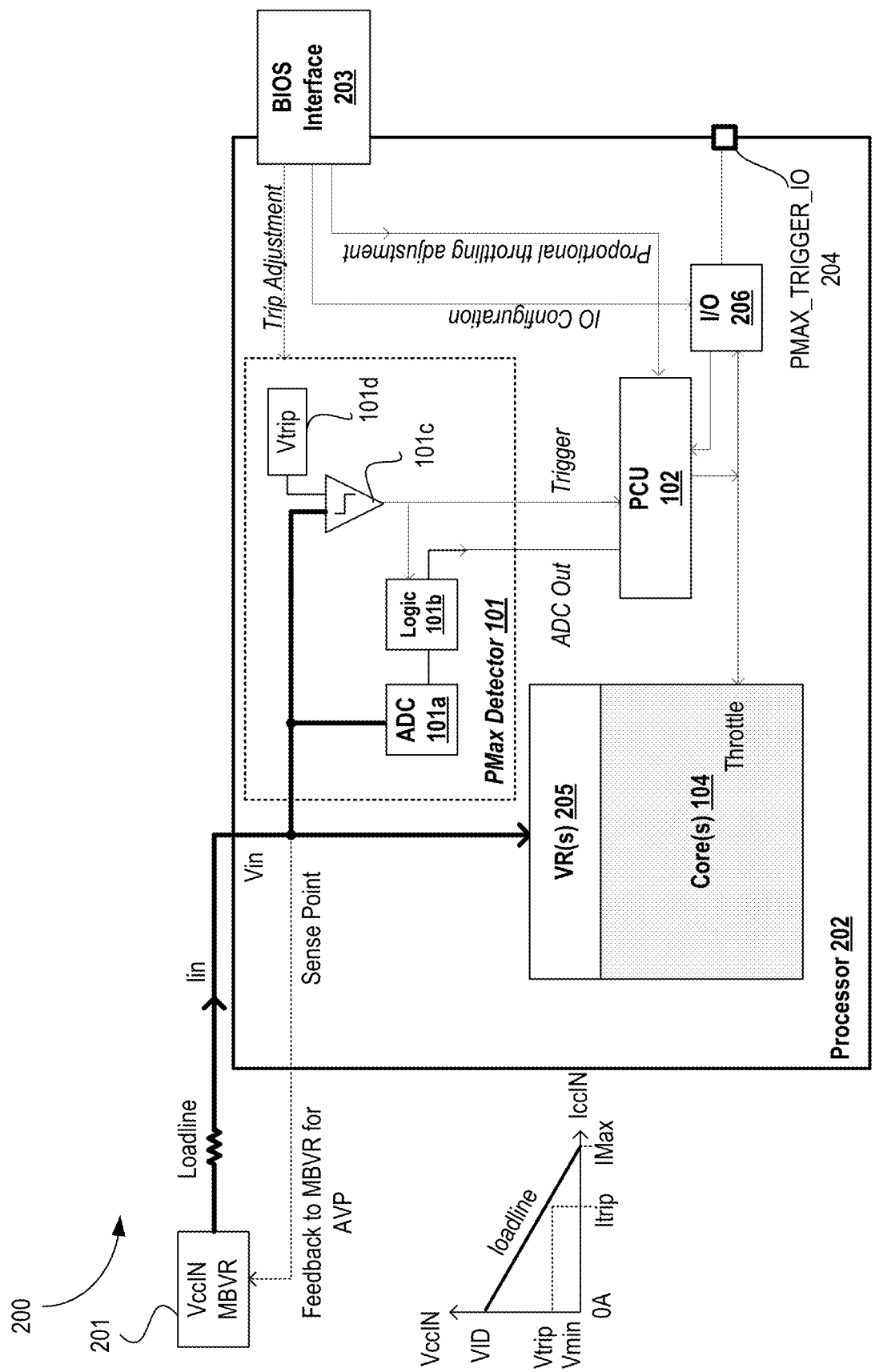
FIG. 2 illustrates a detailed view of the power management system for proportional throttling, in accordance with some embodiments.

FIG. 2 illustrates a detailed view of power management system 200 for proportional throttling, in accordance with some embodiments. System 200 comprises motherboard voltage regulator (MBVR) 201 that generates VccIn. Vccin is provided over a loadline as input Vin (same as VccIn) to processor 202. Processor 202 may be a SoC such as the SoC described with reference to FIG. 7. Referring back to FIG. 2, processor 202 comprises power detector 101 (or PMax detector), PCU 102, BIOS interface 203, and Input and/or output pin 204 (PMAX_TRIGGER_IO). Each Core 104 may have its associated voltage regulator (VR) 205 that receives Vin and generates a local supply for the core. The I/O pin 204 may provide an additional resource to trigger proportional throttling response via I/O logic 206. In some embodiments, the I/O pin 204 is used for debugging or characterizing the function of the proportional throttling scheme.

PCU 102 further comprises comparator 101c and register 101d to store the tripping voltage Vtrip. In some embodiments, Vtrip can be modified by hardware or software, such as BIOS Interface 203. In this example, BIOS Interface 203 sends a modified Vtrip value over signal Trip Adjustment. Here, signal names and node names are interchangeably used. For example, Vin may refer to power supply signal Vin or node Vin depending on the context of the sentence.

In some embodiments, comparator 101c compares Vin with Vtrip, and informs logic 101b and PCU 102 when Vin crosses Vtrip. A lower Vin level indicates higher power usage, which in turn indicates a possible virus application being executed by processor 202. Upon determining that Vin crossed Vtrip, logic 101b identifies and saves a watermark, which is a code from ADC 101a indicating the lowest Vin value identified by ADC 101a. In some embodiments, logic 101b is continuously monitors the output of ADC 101a to determine the watermark. The watermark level indicates the power level of the virus being executed by processor 202. The lowest Vin level identified by logic 101b indicates the most powerful and power hungry virus application. The watermark information (ADC OUT) is provided to PCU 102 which throttles Core(s) 104 upon determination that Vin crossed Vtrip.

The idea behind watermarking in the clock squashed/throttled state is that the magnitude of the excursion of the virus cannot be reliably detected before triggering by Pmax detector 101. This is because as soon as the trip threshold is crossed, core(s) 104 go into throttle mode within nanoseconds and reduce the current consumption making it nearly impossible to measure the excursion. However, during the throttle mode the magnitude of the excursion can be determined easily and over a longer time window.

In some embodiments, BIOS interface 203 can also modify the proportional throttle level. For example, BIOS interface 203 can override the proportional throttle level estimated by PCU 102. The proportional throttle level depends on the watermark level, and so depending on the power consumption of the virus program, a corresponding throttle level is estimated and applied instead of the same throttle level for all virus programs.

Figure 3:
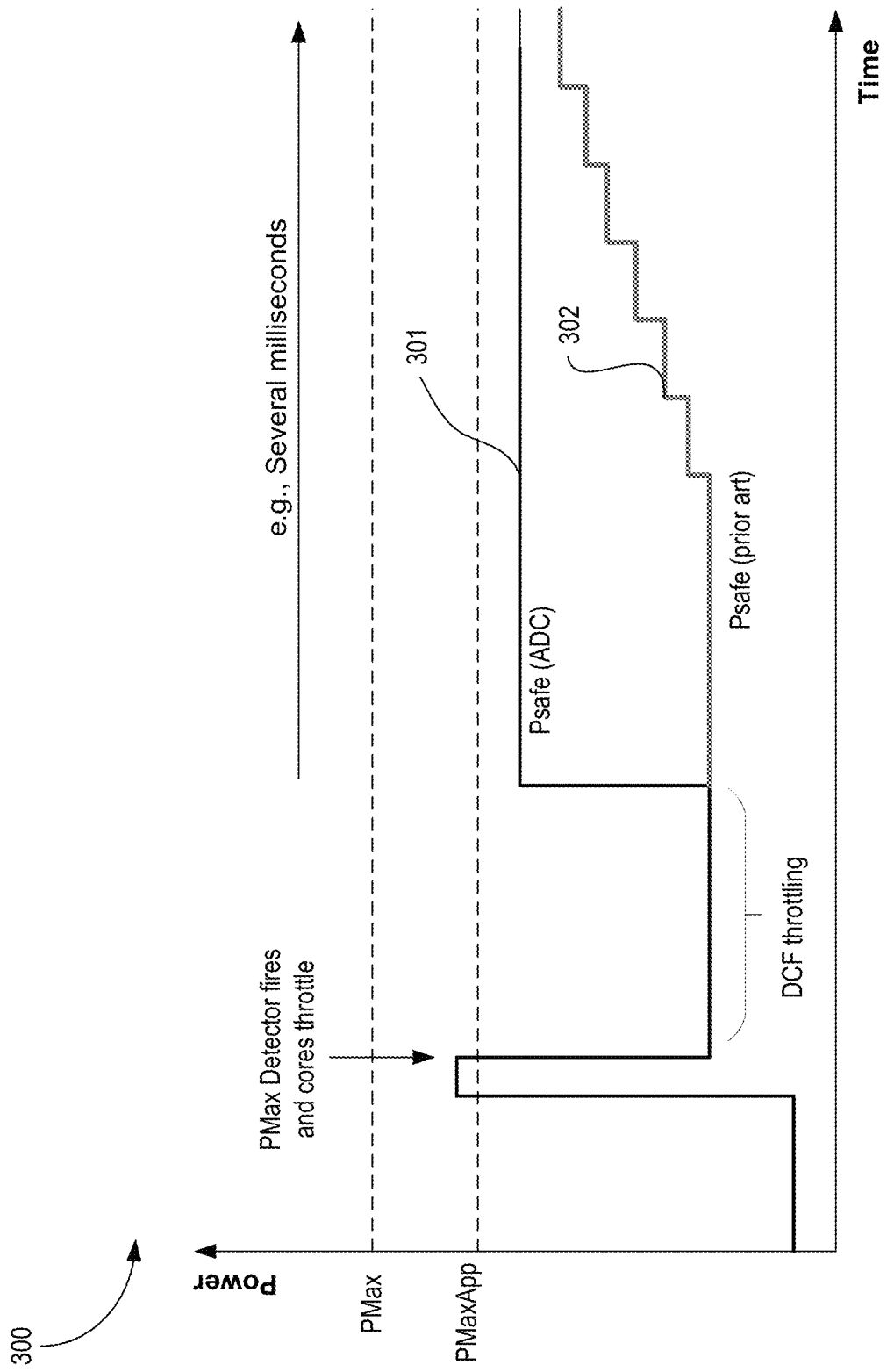
FIG. 3 illustrates a plot showing maximum power (Pmax) detector response in comparison with a prior art scheme, in accordance with some embodiments.

FIG. 3 illustrates plot 300 showing response of maximum power (Pmax) detector 101 in comparison with a prior art scheme, in accordance with some embodiments. Plot 300 shows a power-vs-time plot for a minor power excursion over PmaxApp in Prior Art versus the scheme of various embodiments. Here, the solid dark curve 301 is the response of the proportional throttling scheme while the gray curve 302 is the response of the prior art. In the prior art, when Vin crosses a threshold Vtrip, PCU begins to throttle the cores to a save power level, Psafe, which is a predetermined clock frequency and/or voltage supply level. After some time, the throttling slowly ends as indicated by the stair-case rise in power. In some embodiments, when Vin crosses the threshold Vtrip, PCU 102 issues a throttling instruction for core(s) 104 and then quickly determine a proportional throttle level (e.g., dynamic core frequency, DCF) that depends on the watermark level determined by logic 101b. This proportional throttle level allows processor 202 to operate at Psafe power level, which may be much higher than the prior art Psafe level.

After the throttling mode, the resulting Psafe (and hence performance delivered) can be opportunistically higher with the scheme of various embodiments. To give some context, if there is a 200 W range above PmaxApp (application maximum power) to the maximum power virus (Pmax), with the legacy solution, the processor would take the same throttling action without distinguishing a 1 W excursion versus 200 W excursion. The resulting operating point is highly sub-optimal for the former. These numbers can be worse if user wants to lower the threshold where throttling happens and explore the option of trading minor performance loss with power supply capacity.

Figure 4:
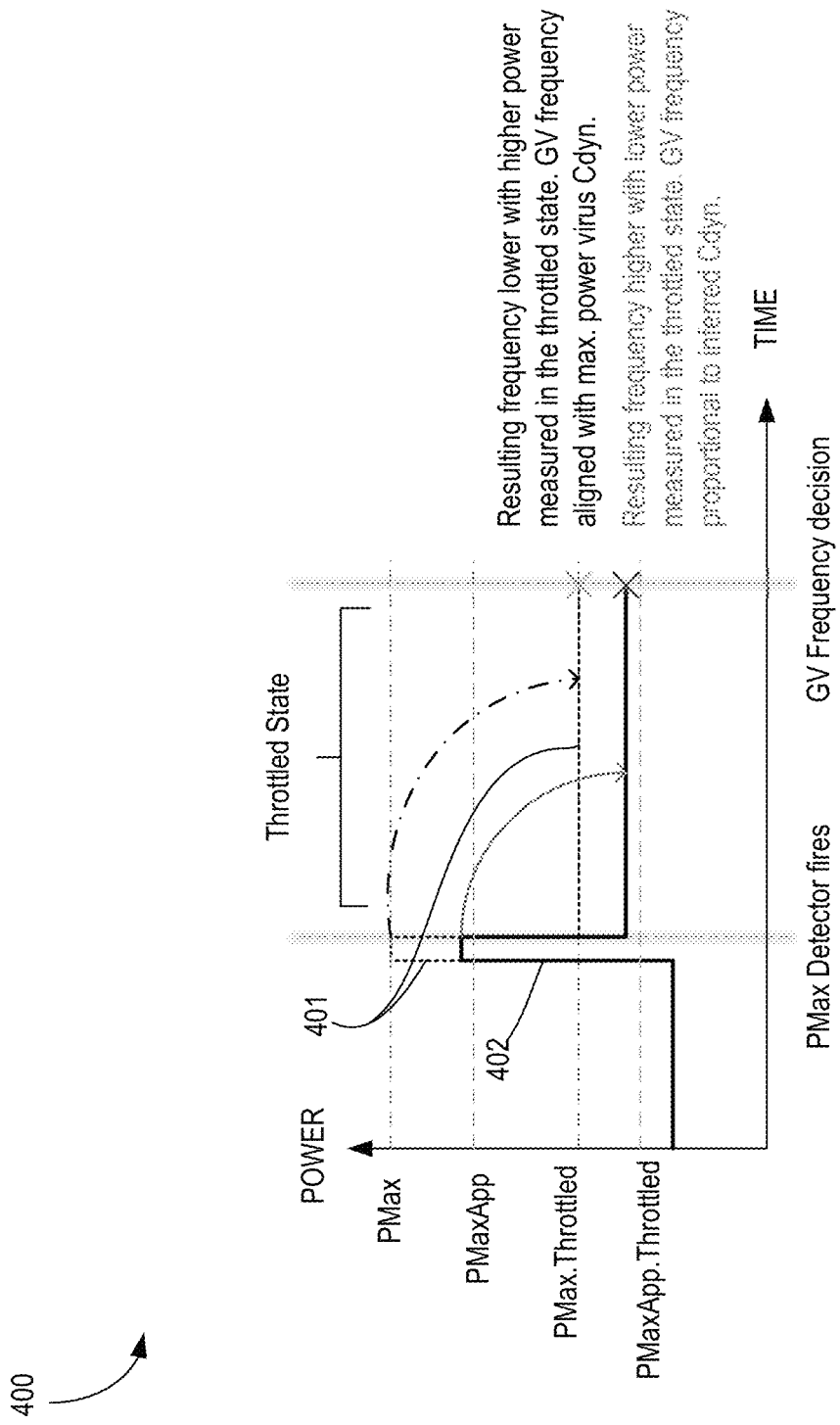
FIG. 4 illustrates a plot showing response for proportional throttling power domain, in accordance with some embodiments.

FIG. 4 illustrates plot 400 showing response for proportional throttling power domain, in accordance with some embodiments. Plot 400 zooms into how the scheme of various embodiments responds to two different power levels at the lower and higher range of the virus spectrum. The dashed line 401 captures the maximum power (PMax) virus scenario while the black trace 402 is a minor excursion over PmaxApp (maximum power for a particular application). Because the Cdyn for minor excursion is smaller than the maximum power virus Cdyn, the power measured in the throttled state for the former is lower than the latter.

Figure 5:
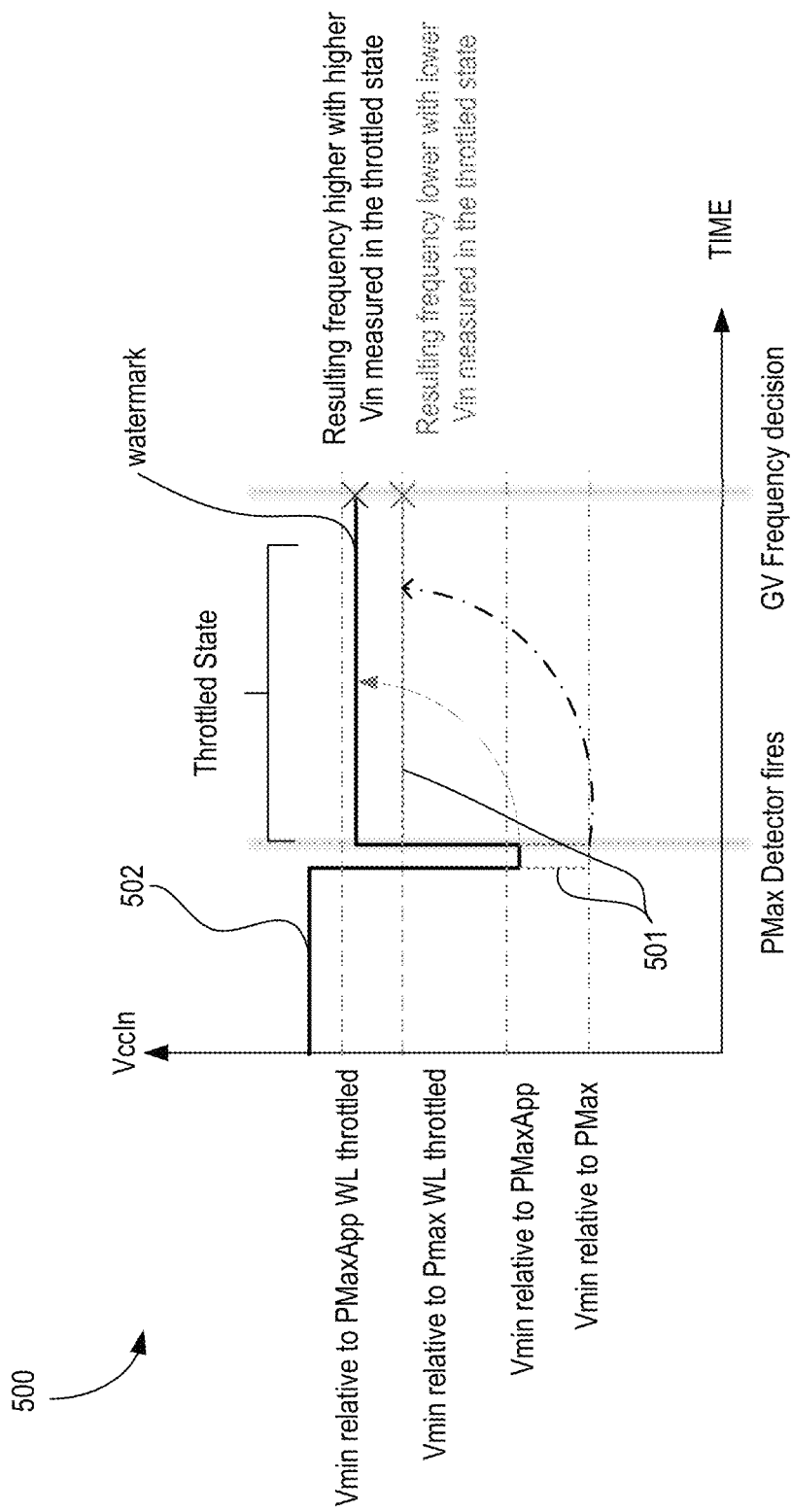
FIG. 5 illustrates a plot showing response for proportional throttling in voltage domain, in accordance with some embodiments.

FIG. 5 illustrates plot 500 showing response for proportional throttling in voltage domain, in accordance with some embodiments. Plot 500 zooms into how the scheme of various embodiments responds to two different voltage levels at the lower and higher range of the virus spectrum. The dashed line 501 captures the maximum power (PMax) virus scenario while the black trace 502 is a minor excursion over PmaxApp (maximum power for a particular application). Because the Cdyn for minor excursion is smaller than the maximum power virus Cdyn, the voltage measured in the throttled state for the former is higher than the latter.

Figure 6:
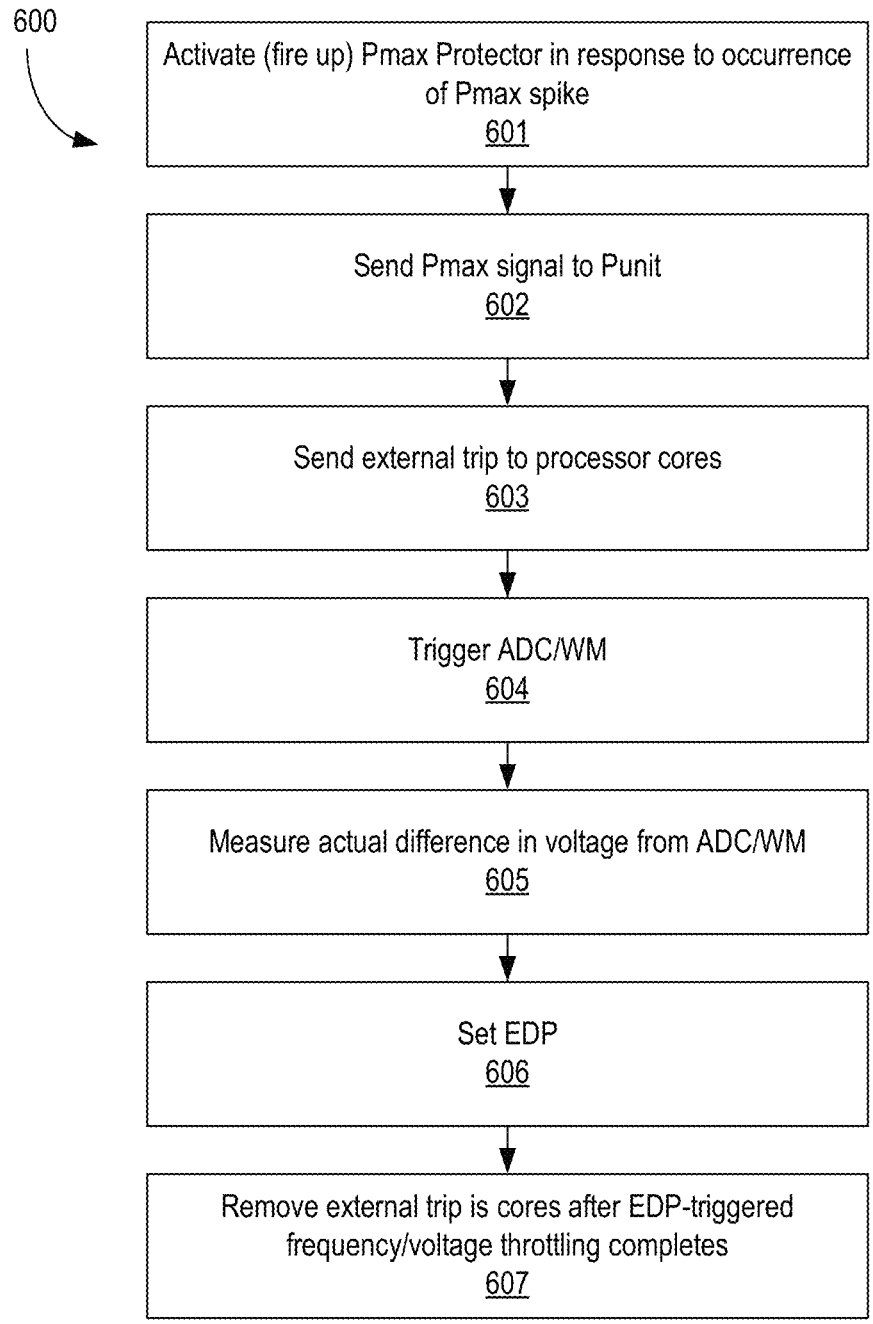
FIG. 6 illustrates a method for proportional throttling in voltage domain, in accordance with some embodiments.

FIG. 6 illustrates flowchart 600 of a method for proportional throttling in voltage domain, in accordance with some embodiments. While various blocks in flowchart 600 are shown in a particular order, the order can be changed. Some blocks may be performed before others, while some blocks may be performed concurrently, in parallel or simultaneously. Some of the operations described in the flowchart art performed by hardware, while some are performed by software or firmware. In some embodiments, the operations performed by hardware can be modified via software. For example, the trip voltage for comparator 101c can be modified using BIOS.

At block 601, maximum power spike is detected, which causes the Pmax detector circuitry 101 to activate (fire up). At block 602, Pmax signal is sent to a power control unit PCU 102 (or Punit). At block 603, external trip is sent by PCU 102 of to the processor cores 104 the processor or SoC 202. In the traditional scheme, a firmware would sent EDP to a safe value Psafe. In various embodiments, ADC 101a and/or watermarking hardware 101b is trigged and a previous WM value is cleared at block 604. At block 605, actual difference (delta_v) in voltage determined by Pcode 103. At block 606, Pcode 103 sets a new EDP (e.g., next target frequency), which is expressed as:

$$EDP = \text{Max}\left(\text{Min}\left(EDP - \frac{(\Delta V_{actual} - \Delta V_{pmax.app})}{(\Delta V_{virus} - \Delta V_{pmax.app})} \cdot (P_{max} - P_{safe}),\right.\right.$$

-continued
$$\left.\left. MIN\_EDP\_REDUCTION\right), P_{safe}\right)$$

where, $\Delta V_{actual}$ is the output code from ADC 101a that is measured in real-time, $\Delta V_{pmax.app}$ is the voltage difference from a marginal virus, $\Delta V_{virus}$ is the voltage difference from a full blown virus. $\Delta V_{pmax.app}$ and $\Delta V_{virus}$ are fixed values that are known for a processor at the time of manufacture. $\Delta V_{actual}$ is a variable which is determined in real-time by ADC 101a and WM hardware 101b. Here, $P_{max}$ is the maximum power that processor 202 can draw. $P_{max}$ is also a known value, which is known at the time of manufacture. $P_{safe}$ is the power value which is the value PCU 102 would throttle processor core(s) 104 to. $P_{safe}$ is also a value known at the time of manufacture. These known values are fused, or can be reprogrammed if needed. EDP used on the right hand side of the equation is the most-recent bottoms-up EDP. This is the EDP actually used by the package in its current operating point, not the top-down maximum current (IccMax) that is fused and/or programmed in. The minimum EDP reduction is PMAX_EDP_REDUCTION (default=10% of EDP).

At block 607, after EDP-triggered voltage and/or frequency change to cores completes, external trip to cores 104 is removed. Over time, EDP is bumped back to normal levels. Vin measurements in the throttled state may not capture the worst power spikes for some workloads, but those cases are still handled adequately by the flow. There are three possible scenarios to consider for the Vin measured in the throttled state:

Case 1. Workload (WL) is static. In this case, the scheme of various embodiments works optimally as intended.

Case 2. Worst-case power spike in the WL happens during watermarking—in this case ADC 101a and WM 101b capture the lowest Vin and determines the appropriate frequency. This is the intended and optimum response.

Case 3. Worst-case power spike in the WL is missed in the watermarking—in this case ADC 101a and WM 101b is more optimistic. However, when firmware Pcode 103 determines the new frequency, it does at least a minimum EDP reduction over prior EDP as shown in FIG. 6. This means that while comparator 101c may re-fire, it will be at a lower frequency than prior fire and subsequent fires decay over time if the pattern persists. Re-fires are not catastrophic because nothing electrically fails in a platform if PMax Detector triggers again. Platform is protected by detector 101, and the subsequent throttling event is justified because the power must exceed the trip threshold Vtrip again even with the minimum EDP reduction. This response, like cases 1 and 2, is also aligned with the concept of the scheme of proportional throttling. In addition to that, voltage is watermarked over approximately 100 samples within approximately 100 μs to get a more reliable measure of the throttled power. There is performance benefit for Cases 1 and 2. Case 3 re-fire is not detrimental to the performance of the workloads of interest and platform is still actively protected by PMax Detector 101.

Some or all elements of embodiments (e.g., flowchart 600, and scheme described with reference to FIGS. 1-6) are also provided as a machine-readable medium (e.g., memory) for storing the computer-executable instructions (e.g., instructions to implement any other processes discussed herein). In some embodiments, a computing platform comprises a memory, a processor, a machine-readable storage media (also referred to as tangible machine readable medium), a communication interface (e.g., wireless or wired interface), and a network bus coupling them.

In some embodiments, the processor is a Digital Signal Processor (DSP), an Application Specific Integrated Circuit (ASIC), a general purpose Central Processing Unit (CPU), or a low power logic implementing a simple finite state machine to perform the method of flowchart 600 and/or various embodiments, etc.

In some embodiments, the various logic blocks of the system are coupled together via the network bus. Any suitable protocol may be used to implement the network bus. In some embodiments, the machine-readable storage medium includes instructions (also referred to as the program software code/instructions) for intelligent prediction of processor idle time as described with reference to the various embodiments and flowchart.

Program software code/instructions associated with the flowchart(s) (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowcharts 200-400 (and/or various embodiments) are executed by the computer system.

In some embodiments, the program software code/instructions associated with flowchart 600 (and/or various embodiments) are stored in a computer executable storage medium and executed by the processor. Here, computer executable storage medium is a tangible machine readable medium that can be used to store program software code/instructions and data that, when executed by a computing device, causes one or more processors to perform a method(s) as may be recited in one or more accompanying claims directed to the disclosed subject matter.

The tangible machine readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with flowchart 600 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, magnetic random access memory, ferroelectric memory, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, the tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 7:
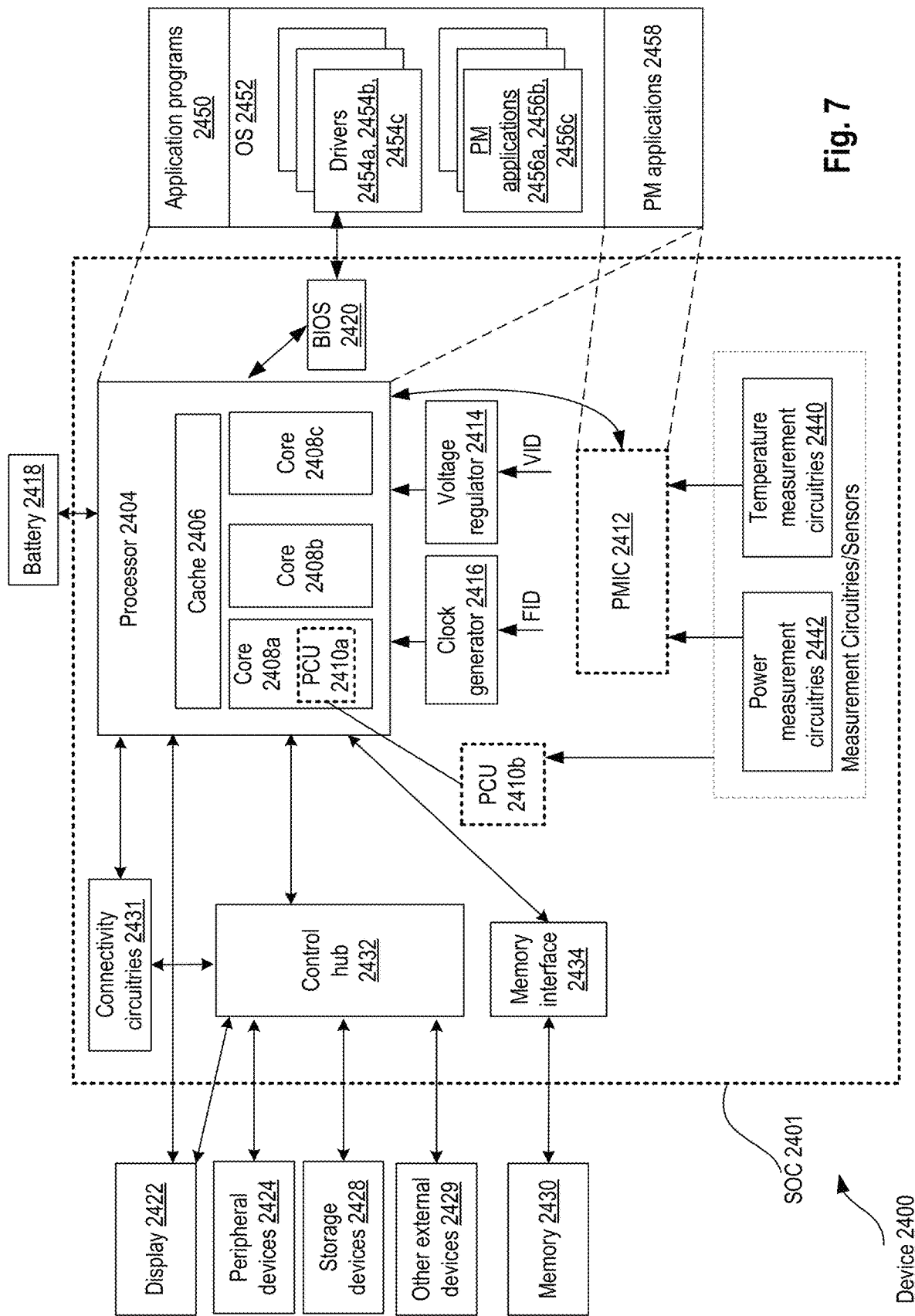
FIG. 7 illustrates a smart device or a computer system or a SoC (System-on-Chip) having apparatus for proportional throttling, in accordance with various embodiments.

FIG. 7 illustrates a smart device or a computer system or a SoC (System-on-Chip) having apparatus for proportional throttling, in accordance with various embodiments. It is pointed out that those elements of FIG. 7 having the same reference numbers (or names) as the elements of any other figure can operate or function in any manner similar to that described, but are not limited to such. While the various embodiments are illustrated as being performed by power management unit 102, any of the blocks described here that can control power for the computer system can have the apparatus and/or software apparatus for proportional throttling. For example, PCU 2410*a*, PCU 2410*b*, and/or PMIC 2412 can perform proportional throttling.

In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises a SoC (System-on-Chip) 2401. An example boundary of the SOC 2401 is illustrated using dotted lines in FIG. 7, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408a, 2408b, 2408c. Although merely three cores 2408a, 2408b, 2408c are illustrated in FIG. 7, processor 2404 may include any other appropriate number of processing cores, e.g., tens, or even hundreds of processing cores. Processor cores 2408a, 2408b, 2408c may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408a, a second section of cache 2406 dedicated to core 2408b, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 2404 may also include a bus unit to enable communication between components of processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, a cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments, and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400.

In some embodiments, memory 2430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 2430 can be a dynamic random access memory (DRAM) device, a static random access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408*a*, 2408*b*, 2408*c*, voltage regulator 2414, memory 2430, a mother-board of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 2410*a/b* and/or PMIC 2412. In some embodiments, each core has a network of distributed LDOs to provide efficient control for power management. The LDOs can be digital, analog, or a combination of digital or analog LDOs.

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410*a*. In an example, some other sections of PCU 2410 may be implemented outside the processing cores 2408, and these sections of PCU 2410 are symbolically illustrated using a dotted box and labelled as PCU 2410*b*. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456*a*, 2456*b*, 2456*c*. The OS 2452 may also include various drivers 2454*a*, 2454*b*, 2454*c*, etc., some of which may be specific for power management purposes. In some embodiments, device 2400 may further comprise a Basic Input/Output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Various embodiments described herein are illustrated as examples. The features of these examples can be combined with one another in any suitable way. These examples include:

Example 1: An apparatus comprising: a power detector to detect when a voltage level of a power supply crosses a threshold, and to save a watermark indicative of a minimum voltage level of the power supply; one or more processor cores; and a power control unit (PCU) communicatively coupled to the power detector, wherein the PCU is to proportionally throttle the one or more processor cores according to the watermark and after the voltage level crosses the threshold.

Example 2: The apparatus of example 1, wherein the power detector comprises an analog-to-digital converter to continuously digitize the voltage level of the power supply.

Example 3: The apparatus of example 2, wherein the power detector comprises circuitry to analyze the digitized voltage level and identity the minimum voltage level of the power supply, and save the minimum voltage level as the watermark.

Example 4: The apparatus of example 1, wherein the power detector comprises a comparator to compare the voltage level of the power supply against the threshold.

Example 5: The apparatus of example 4, wherein the PCU is to receive the watermark and an output of the comparator.

Example 6: The apparatus of example 1 comprises an I/O interface to trigger the PCU to proportionally throttle the one or more processor cores according to the watermark and after the voltage level crosses the threshold.

Example 7: The apparatus of example 1 comprises an interface to receive instructions from a BIOS to modify the threshold.

Example 8: A machine-readable storage media having machine-readable instructions stored thereon, that when executed, cause one or more machines to perform an operation comprising: determining a throttle frequency according to according to a watermark and after a voltage level of a power supply crosses a threshold; proportionally throttling one or more processor cores with the throttle frequency; and disabling the operation of proportionally throttling once the voltage level of the power supply no longer crosses the threshold.

Example 9: The machine-readable storage media of example 8, wherein the watermark is generated by continuously analyzing an output of an analog-to-digital converter (ADC), wherein the ADC digitizes voltage of the power supply.

Example 10: The machine-readable storage media of example 8, wherein the watermark is indicative of a minimum voltage level of the power supply.

Example 11: The machine-readable storage media of example 8, wherein the threshold is modifiable via instructions from a BIOS.

Example 12: The machine-readable storage media of example 8, wherein proportionally throttling the one or more processor cores with the throttle frequency is triggered by a signal on an I/O interface.

Example 13: The machine-readable storage media of example 8, wherein proportionally throttling the one or more processor cores comprises clock squashing.

Example 14: A system comprising: a memory; a processor coupled to the memory, wherein the processor comprises: a power detector to detect when a voltage level of a power supply crosses a threshold, and to save a watermark indicative of a minimum voltage level of the power supply; one or more processor cores; and a power control unit (PCU) communicatively coupled to the power detector, wherein the PCU is to proportionally throttle the one or more processor cores according to the watermark and after the voltage level crosses the threshold; and a wireless interface to allow the processor to communicate with another device.

Example 15: The system of example 14, wherein the power detector comprises an analog-to-digital converter to continuously digitize the voltage level of the power supply.

Example 16: The system of example 15, wherein the power detector comprises circuitry to analyze the digitized voltage level and identity the minimum voltage level of the power supply, and save the minimum voltage level as the watermark.

Example 17: The system of example 14, wherein the power detector comprises a comparator to compare the voltage level of the power supply against the threshold.

Example 18: The system of example 17, wherein the PCU is to receive the watermark and an output of the comparator.

Example 19: The system of example 14 comprises an I/O interface to trigger the PCU to proportionally throttle the one or more processor cores according to the watermark and after the voltage level crosses the threshold.

Example 20: The system of example 14 comprises an interface to receive instructions from a BIOS to modify the threshold.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   one or more processor cores;
   a power detector configured to:
   measure, a minimum voltage level of a power supply as a watermark, where the watermark corresponds to a highest power level provided by the power supply over a window of time;
   save an indication of the watermark;
   determine a predetermined maximum power threshold;
   determine, based on a comparison of the highest power level to the predetermined maximum power threshold, an amount that the highest power level exceeds the predetermined maximum power threshold; and
   provide an indication of the amount to a power control unit (PCU) that is communicatively coupled to the power detector; and
   the PCU, wherein the PCU is configured to proportionally throttle the one or more processor cores based on the amount.

2. The apparatus of claim 1, wherein the power detector comprises an analog-to-digital converter to continuously digitize a voltage level of the power supply.

3. The apparatus of claim 1, wherein the PCU is to compare the watermark with predefined voltage levels corresponding to power levels to determine an amount by which to proportionally throttle the one or more processor cores.

4. The apparatus of claim 1, further comprising an input/output (I/O) interface to trigger the PCU to proportionally throttle the one or more processor cores.

5. A system comprising:
   a memory; and
   a processor coupled to the memory, wherein the processor comprises:
   one or more processor cores;
   a power detector configured to:
   measure a minimum voltage level of a power supply as a watermark, where the watermark corresponds to a highest power level provided by the power supply over a window of time;
   save an indication of the watermark;
   determine predetermined maximum power threshold;
   determine, based on a comparison of the highest power level to the predetermined maximum power threshold, an amount that the maximum highest power level exceeds the predetermined maximum power threshold; and
   provide an indication of the amount to a power control unit (PCU) that is communicatively coupled to the power detector; and
   the PCU, wherein the PCU is configured to proportionally throttle the one or more processor cores based on the amount.

6. The system of claim 5, wherein the power detector comprises an analog-to-digital converter to continuously digitize a voltage level of the power supply.

7. The system of claim 5, wherein the PCU is to compare the watermark with predefined voltage levels corresponding to power levels to determine an amount by which to proportionally throttle the one or more processor cores.

8. The system of claim 5, further comprising an input/output (I/O) interface to trigger the PCU to proportionally throttle the one or more processor.

* * * * *